US012723695B2

(12) United States Patent
Carpenter

(10) Patent No.: US 12,723,695 B2
(45) Date of Patent: Sep. 1, 2026

(54) WATER GROUNDING APPARATUS FOR A PLASTIC PIPE PLUMBING SYSTEM

(71) Applicant: Paul B Carpenter, Springfield, OH (US)

(72) Inventor: Paul B Carpenter, Springfield, OH (US)

(*) Notice: Subject to any disclaimer, the term of this patent is extended or adjusted under 35 U.S.C. 154(b) by 191 days.

(21) Appl. No.: 18/673,602

(22) Filed: May 24, 2024

(65) Prior Publication Data

US 2025/0027591 A1 Jan. 23, 2025

Related U.S. Application Data

(60) Provisional application No. 63/527,101, filed on Jul. 17, 2023.

(51) Int. Cl.
*F16L 55/00* (2006.01)
*F16L 55/07* (2006.01)
*H01R 4/66* (2006.01)

(52) U.S. Cl.
CPC ................ *F16L 55/00* (2013.01); *H01R 4/66* (2013.01); *F16L 55/07* (2013.01)

(58) Field of Classification Search
CPC ....... F16L 55/00; F16L 55/07; F16L 55/1018; F16L 11/12; F16L 11/127; H01R 4/66; E03B 7/071; E03B 7/074
See application file for complete search history.

(56) References Cited

U.S. PATENT DOCUMENTS 4,106,832 A * 8/1978 Burns ...................... H01R 4/64 439/100
4,312,551 A * 1/1982 Mascolo ................ F16L 25/01 439/387
5,480,311 A * 1/1996 Luu ....................... H01R 4/643 439/208
6,965,079 B2 * 11/2005 Westberry ............... H01R 4/66 174/650
2017/0214185 A1 * 7/2017 Goodson ................ F16L 25/01
2021/0071787 A1 * 3/2021 Kang ................... F16L 23/003
2022/0178483 A1 * 6/2022 Terry ..................... F16L 47/24

OTHER PUBLICATIONS

Spec sheet for PoolBond Part No. PB-2008, downloaded fromPoolBond website. Dated Aug. 6, 2014.

* cited by examiner

*Primary Examiner* — John B Freal
(74) *Attorney, Agent, or Firm* — Mark A Navarre

(57) ABSTRACT

Water grounding apparatus for a water plumbing system constructed of plastic pipes comprises a metal or other electrically conductive fixture installed axially inline with the plastic pipes. The fixture includes one or more external lugs for ground wire connection, and an integral sleeve of reduced diameter that extends into the plastic piping to establish an extended surface area contact between the fixture and the water in the pipes. Alternatively, the integral sleeve can be constructed as a coil of conductive material to accommodate nearby elbows in the plastic piping. Advantageously, the fixture can be constructed as a modified inline water shut-off valve since shut-off valves are customarily installed in piping near the exterior wall of the building, and near water-related appliances such as water heaters.

9 Claims, 1 Drawing Sheet

WATER GROUNDING APPARATUS FOR A PLASTIC PIPE PLUMBING SYSTEM

PRIORITY APPLICATION INFORMATION

This application claims the benefit of earlier-filed Provisional Patent Application No. 63/527,101, filed Jul. 17, 2023.

TECHNICAL FIELD

This invention relates to residential and commercial water plumbing systems constructed of plastic piping, and more particularly to a fixture installed inline with the plastic piping for establishing a reliable ground for appliances or electrical panels requiring a ground reference.

BACKGROUND OF THE INVENTION

Various appliances installed in residential and commercial buildings require a ground reference to safely discharge transient electrical surges due to failure conditions or external events such as lightning. Indeed, electrical building codes require such grounding. When water plumbing was constructed of metal piping, the appliances were nearly always ground referenced to the metal piping. However, the traditional metal piping (copper or galvanized steel) has been widely replaced by plastic piping (PVC or PEX), especially in new or retrofit construction. Consequently, appliances are frequently inadequately grounded, or earth-grounded at considerable expense and inconvenience.

This problem has been recognized in the plumbing and electrical industries, and it has been suggested to ground-reference the building appliances and panels through the water in the plastic piping. In the U.S. Pat. No. 6,965,079 to Westberry, for example, this is accomplished with a plastic offset plumbing fixture having a pass-through metal conductor. The metal conductor external to the fixture can be referenced to earth ground to establish an earth ground for the water in the plastic piping, and a similar pass-through fixture installed elsewhere in the plumbing system can be used to ground an appliance or electrical panel to the water, with the inherent conductivity of the water electrically coupling the appliance or panel to the earth ground through the pass-though fixtures. While this approach is valid in principle, it has not been adopted in the industry, and no such fixtures are commercially available despite the known existence of a potential solution to the grounding problem posed by plastic piping. This is likely due to the fact that the Westberry fixture introduces an offset in the water piping, and also introduces a potential water leak point where the metal conductor passes through the fixture.

SUMMARY OF THE INVENTION

The present invention is directed to an improved water grounding apparatus for a plastic or other electrically-nonconductive piping system, the apparatus including a metal or other electrically-conductive fixture installed axially inline with the plastic piping. The fixture includes one or more external lugs for ground wire connection to earth ground, and in a preferred embodiment includes an integral sleeve of reduced diameter that extends into the plastic piping to establish an extended surface area contact between the electrically-conductive fixture and the water in the electrically-nonconductive piping. Alternatively, the integral sleeve can be constructed as a coil of electrically-conductive material to accommodate nearby elbows in the electrically-nonconductive piping. The fixture is preferably constructed as a modified inline water shut-off valve since shut-off valves are customarily installed in piping near the exterior wall of the building, and near water-related appliances such as water heaters, thereby simplifying the plumbing installation.

DESCRIPTION OF THE PREFERRED EMBODIMENT

Figures 1, 2:
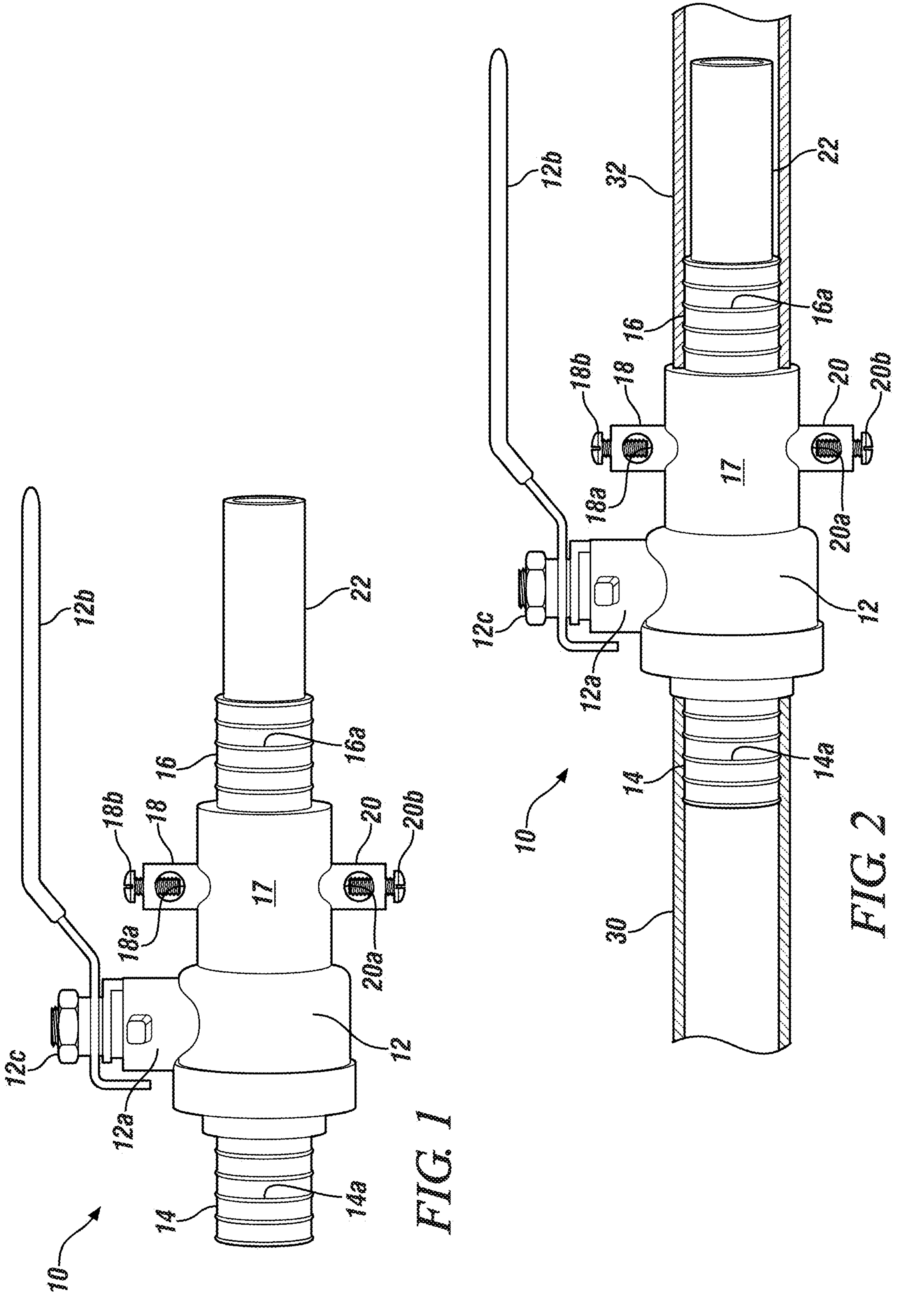
FIG. 1 is an isometric side view of a water grounding inline shut-off valve according to this invention.
FIG. 2 is an isometric view of the water grounding inline shut-off valve of FIG. 1, installed as an inline element of a plastic plumbing system.

As mentioned above, the present invention is directed to an inline plumbing fixture that utilizes the water in a plastic pipe plumbing system to establish an adequate ground reference for water-related appliances and electrical panels in residential and commercial buildings. Referring to FIGS. 1-2, the inline plumbing fixture of this invention is generally designated by the reference numeral 10. In the illustrated embodiment, the fixture 10 is constructed as a modified shut-off valve constructed of brass or another suitable electrically-conductive material. As with a conventional shut-off valve, the fixture 10 includes an internal stopcock valve 12 and valve stem 12*a* with a handle 12*b* fastened to the valve stem 12*a* with a lock-nut 12*c*, and water outlet and inlet pipes 14, 16. As discussed below, however, the fixture 10 may be constructed as an axially inline sleeve without incorporating the stopcock valve 12. Preferably, the outlet and inlet pipes 14, 16 are provided with external peripheral ribbing 14*a*, 16*a* for crimp attachment of PEX-type plastic outlet and inlet pipes 30, 32 as shown.

The fixture 10 of FIGS. 1-2 differs from a conventional metal shut-off valve in two important respects. First, it includes an integral tubular extension 17 on the inlet (or alternately, outlet) side of the valve 12 and a pair of integral connector lugs 18 and 20 formed on the exterior periphery of the tubular extension 17. And second, the fixture 10 includes an integral sleeve 22 extending outboard of, and inline with, the inlet (or alternately, outlet) pipe 16. The plastic inlet pipe 32 on the inlet side of the fixture 10 fits over both the inlet pipe 16 and the sleeve 22 as shown in FIG. 2. As seen in FIGS. 1-2, the sleeve 22 has a smaller diameter than the inlet (or alternately, outlet) pipe 16 so that water in the plastic inlet pipe 32 contacts both the exterior and interior peripheries of the sleeve 22, providing a large surface area of contact between the sleeve 22 and the water in the plastic inlet pipe 32.

The tubular extension 17 of fixture 10 includes a pair of electrical connector lugs 18, 20 for ground wire connection. In conventional fashion, a ground wire (not shown) referenced to earth ground can be inserted into the lug aperture 18*a*, 20*a*, and the set screw 18*b*, 20*b* tightened against the ground wire to fasten the ground wire and establish a solid electrical connection between the ground wire and the metal body of the fixture 10. Of course, the lugs 18, 20 may be different in number than shown, or may be positioned differently—for example, side by side.

With the water grounding apparatus of this invention, a typical plumbing installation will require two or more of the inline plumbing fixtures 10. One fixture 10 is installed in the building water supply pipe near the exterior wall of the building, and one or more fixtures 10 are installed at distributed points in the plumbing piping in the building. The fixture 10 installed in the building water supply pipe near the exterior wall of the building serves to establish an earth ground for the water in the water supply pipe. This fixture 10 can be buried underground in the soil outside the wall of the building, or it may be installed inside the building with a conductor wire connected between one of the grounding lugs 18, 20 and buried ground rod or plate. The fixtures 10 installed at distributed points in the plumbing piping in the building provide grounding points for various appliances or electrical panels in the building by connecting a grounding wire between the appliance or panel and a grounding lug 18, 20 on the fixture 10.

The fixtures 10 can conveniently be constructed with an integral shut-off valve 12 as shown because shut-off valves are ordinarily installed at several points in a building in any case. Shut-off valves are also typically installed in the water supply lines for water-related appliances such as water heaters or water softeners, and the illustrated fixture 10 can be substituted for a conventional shut-off valve in such instances, and thereby serve as a grounding point for such appliances. In all cases, the inherent conductivity of the water in the plastic water pipes provides electrical conductivity between the grounding lugs 18, 20 and the earth ground reference of the fixture 10 in the water supply line to the building.

The fixture 10 of this invention, with or without the stopcock valve 12, is inherently an axially inline fixture, which is to say, the water supply pipes 30, 32 upstream and downstream of the fixture 10 remain in-line with each other. Put another way, installation of the fixture 10 does not result in the upstream and downstream pipes 30, 32 being axially offset, as with the apparatus described by Westberry. This is an important consideration, especially when retrofitting an existing plumbing system. Also, the fixture 10 of this invention does not introduce another potential point of water leakage, as do pass-through fixtures of the type described by Westberry.

In summary, the fixture 10 of this invention provides a convenient and reliable ground connection point for appliances and panels in residential and commercial buildings. The tubular sleeve 22 of the fixture 10 extends well into the inlet water supply line to provide a large surface area contact with the water therein for enhanced electrical conductivity between the water and the fixture grounding lugs 18, 20. Optionally, the tubular sleeve 22 may be replaced with a coil of conductive metal for flexibility when retrofitting plumbing with an elbow bend in proximity to the existing shut-off valve, while achieving the same effect as the tubular sleeve 22. Other variations to the illustrated embodiment of this invention are also possible; for example, the inlet and outlet pipes may be reversed, and so on. Accordingly, it will be appreciated that fixtures incorporating these and other modifications and variations may still fall within the intended scope of the invention.

The invention claimed is:

1. Water grounding apparatus for a plumbing system that conveys water through electrically non-conductive pipes, comprising:

an electrically conductive fixture installed axially inline with first and second axially-aligned electrically non-conductive pipes of said plumbing system, said electrically conductive fixture including a tubular portion through which said water is conveyed, said tubular portion having an interior periphery that extends into one of the first and second electrically non-conductive pipes in contact with said water to establish an extended surface area contact between said tubular portion and said water, and an exterior periphery having at least one grounding lug disposed thereon for ground wire connection to earth ground to thereby establish a local earth ground reference for the water conveyed by said plumbing system.

2. The water grounding apparatus of claim 1, wherein:

said electrically conductive fixture incorporates a water shut-off valve.

3. The water grounding apparatus of claim 1, wherein:

said interior periphery of said tubular portion includes a sleeve of electrically conductive material that extends into said one electrically non-conductive pipe, where the water in said one electrically non-conductive pipe is in contact with both an inner periphery of said sleeve and an outer periphery of said sleeve.

4. The water grounding apparatus of claim 1, wherein:

said interior periphery of said tubular portion includes a flexible coil of electrically conductive material that extends into said one electrically non-conductive pipe.

5. Water grounding apparatus for a water plumbing system for a building and constructed of electrically non-conductive pipes, said water grounding apparatus comprising:

a first electrically conductive fixture installed axially inline with a first electrically non-conductive pipe of said plumbing system near an exterior wall of said building where said electrically non-conductive pipes enter said building, and a second electrically conductive fixture installed axially inline with a second electrically non-conductive pipe of said plumbing system remote from said first electrically non-conductive pipe, where said first electrically conductive fixture includes a grounding lug electrically connected to an earth ground reference, and said second electrically conductive fixture includes a grounding lug electrically connected to a device in said building to provide an earth ground reference for such device through the water in said electrically non-conductive pipes.

6. The water grounding apparatus of claim 5, wherein:

said first and second electrically conductive fixtures both incorporate a water shut-off valve.

7. The water grounding apparatus of claim 5, wherein:

said first and second electrically conductive fixtures each include an integral electrically conductive element extending into a respective electrically non-conductive pipe in contact with water therein to establish an extended surface area contact between a respective fixture and the water in said respective electrically non-conductive pipe.

8. The water grounding apparatus of claim 7, wherein:

said an integral electrically conductive element is a sleeve of conductive material that extends into said one non-conductive pipe, where the water in said non-conductive pipe is in contact with both an inner periphery of said sleeve and an outer periphery of said sleeve.

9. The water grounding apparatus of claim 7, wherein:

said an integral electrically conductive element is a flexible coil electrically conductive material that extends into said respective electrically non-conductive pipe.

* * * * *